(12) United States Patent
Kasamura

(10) Patent No.: US 7,408,912 B2
(45) Date of Patent: Aug. 5, 2008

(54) MODULATION METHOD AND CIRCUIT FOR TIME DIVISION MULTIPLE ACCESS

(75) Inventor: Kenji Kasamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1013 days.

(21) Appl. No.: 10/425,617

(22) Filed: Apr. 30, 2003

(65) Prior Publication Data

US 2004/0105419 A1    Jun. 3, 2004

(30) Foreign Application Priority Data

Nov. 29, 2002    (JP) ............................. 2002-348802

(51) Int. Cl.
*H04J 3/00*    (2006.01)
(52) U.S. Cl. .................. 370/345; 370/347; 370/442; 370/498; 375/261
(58) Field of Classification Search .................. 370/345
See application file for complete search history.

(56) References Cited

U.S. PATENT DOCUMENTS 5,889,791 A * 3/1999 Yang ........................... 714/752
5,990,755 A   11/1999 Takaaki
6,611,530 B1 * 8/2003 Apostolopoulos ............ 370/442
2002/0136196 A1   9/2002 Moon et al.
2004/0105419 A1 * 6/2004 Kasamura .................... 370/345

FOREIGN PATENT DOCUMENTS

| JP | 09-153919 | 6/1997 |
| JP | 9-153919 | 6/1997 |
| JP | 2002-290362 | 10/2002 |

* cited by examiner

*Primary Examiner*—Huy D. Vu
*Assistant Examiner*—Salvador E Rivas
(74) *Attorney, Agent, or Firm*—Rabin & Berdo, P.C.

(57) ABSTRACT

An improved modulation circuit and method for TDMA are provided, wherein the transmission data (TD) in odd-numbered time-slots are processed based on a transmission-window signal (Twe) with a differential encoder (10o), a timing generator (20o), a filter (30o), an amplitude data generator (40o), a multiplier (50o), and an I/Q-discriminator (60o), which are configured as odd-dedicated units, and is output from an adder (71) as transmission signal data (IT) and (QT). The transmission data (TD) in even-numbered time-slots is processed with a differential encoder (10e) and other components, which are configured as even-dedicated units, and is output from the adder (71) in common. Thereby, the appropriate data transmission can be achieved in spite of a decrease of guard bits between a couple of time-slots.

4 Claims, 5 Drawing Sheets

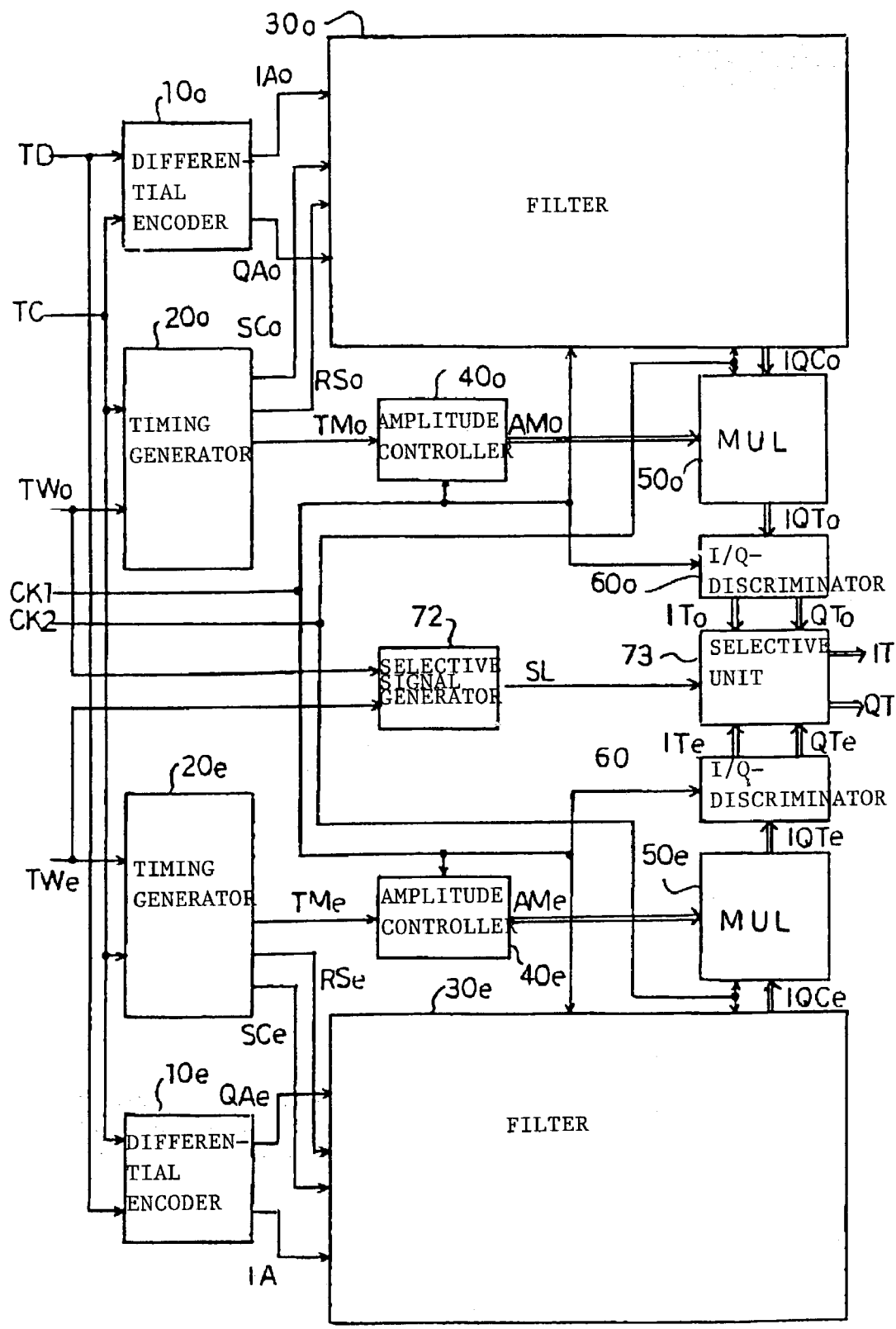
F I G. 4

MODULATION METHOD AND CIRCUIT FOR TIME DIVISION MULTIPLE ACCESS

FIELD OF THE INVENTION

The present invention relates generally to Time Division Multiple Access (TDMA) and, in particular, to a TDMA modulation method and circuit.

BACKGROUND OF THE INVENTION

FIG. 2 is a schematic diagram explaining such a TDMA communication system as disclosed in Japanese Patent Kokai 09-153919. The TDMA system is operable with Personal Handy-phone System (PHS) standard RCR STD-28 (the second generation cordless telephone system standard) recognized by the Association of Radio Industries and Businesses (ARIB) in Japan.

As shown in FIG. 2, a frame of 5 ms is divided into eight time-slots of 625 µs. The preceding four time-slots of each frame are assigned to CH1-CH4 which are provided for a transmission of signals from a base station to mobile terminals. The succeeding four time-slots of each frame are assigned to CH1-CH4 which are provided for the transmission of signals from mobile terminals to a base station. Each of the former CH1-CH4 and the corresponding one of the latter CH1-CH4 are combined with one another so as to accomplish bi-directional communication in a time divisional manner.

An information block of 240 bits can be conveyed by each of time-slots at the transmission rate of 384 Kbps. The leading 4 bits of the information block are ramp bits for a rising edge, the succeeding 220 bits are a transmission data block to be transmitted, the further succeeding 4 bits are ramp bits for a trailing edge, the remaining 12 bits are guard bits.

The ramp bits provide a gradually rising of the information block and insures a certain margin for a duration of trailing of the block so as to suppress some spurious components caused by an abrupt rising and trailing edge of the information block successively emitted from each channel in a burst form. The guard bits are provided to designate a null signal period so as to prevent the transmission signals from colliding with each other between channels due to a drift of transmission timing.

The transmission data block of 220 bits includes information data, start bits, a preamble, and error correction check bits to provide 32 Kbps full-duplex communication through each of CH1-CH4. The standard in PHS stipulates that a carrier should be transmitted while being modulated in the $\pi/4$ shift QPSK orthogonal modulation.

FIG. 3 shows an exemplary block diagram illustrating a prior art modulation circuit for TDMA shown in FIG. 2.

This modulation circuit includes a differential encoder 10 which is provided with transmission data TD and a transmission clock TC from a S/R (Send/Receive) control circuit (not shown), a timing generator 20 provided with the transmission clock TC and a transmission-window signal TW, and a filter 30. The differential encoder 10 generates a signal IA of the in-phase component and a signal QA of the quadrature-phase component in the $\pi/4$ shift QPSK orthogonal modulation from the transmission data TD of 384 Kbps which is burst and synchronized with the transmission clock TC of 384 KHz, thereby supplying the signals IA and QA to the filter 30. The timing generator 20 generates timing signals required for the respective parts of this modulation circuit based on the transmission clock TC and the transmission-window signal TW corresponding to the transmission data TD of 220 bits.

The filter 30 includes shift registers 31 and 32, a selector (SEL) 33, a counter (CNT) 34, and a read only memory 35 (referred to as a ROM 35 hereinafter) to transform the signals IA and QA to signals in a narrow-band (referred to as narrow-banded signals hereinafter) using Nyquist Filter Method.

The shift registers 31 and 32 convert the signals IA and QA into signals IB and QB in a parallel form in accordance with a shift clock SC of 192 kHz supplied from the timing generator 20 and outputs them. The contents of the shift registers 31 and 32 are cleared in response to a reset signal RS supplied from the timing generator 20. The output ports of the shift registers 31 and 32 are coupled with input ports of the selector 33.

The selector 33 selects an alternate one of the signals IB and QB in response to a clock CK1 supplied from S/R control circuit (not shown) and output it as a signal IBQ. The frequency of the clock CK1 is 1.92 MHz, which is 10 times as long as the shift clock SC. The counter 34 counts the clock CK1 repetitively from 0 to 9 in increments of 1. Its count value CN is provided as an address signal for the ROM 35 together with the signal IBQ. The counter 34 is configured to reset at a rising edge of the shift clock SC supplied from the timing generator 20.

The ROM 35 stores data of narrow-banded signal waveforms which contain in-phase components and quadrature-phase components of the $\pi/4$ shift QPSK orthogonal modulation signal. The ROM 35 is configured to store the values sampled from the signals IB and QB at the frequency being 10 times as long as a modulation rate (192 K symbol/s). Specifying an address for the ROM 35 by means of the signal IBQ and the count value CN, the corresponding stored value can be read as data IQC.

Furthermore, this modulation circuit includes an amplitude controller 40, a multiplier (MUL) 50, and an I/Q-discriminator 60.

The amplitude controller 40 is comprised of an up-down counter to generate an amplitude data AM for controlling the amplitude of transmission signals based on a count control signal TM supplied from the timing generator 20 and a clock CK1 supplied from a S/R control circuit (not shown). That is, the amplitude controller 40 will be reset to zero during the period when there is no transmission data and when the guard bits in the transmission time-slot appear. The amplitude controller 40 is caused to count up by the clock CK1 during a period of ramp bits in a rising edge. During a period of the transmission data etc., the amplitude controller 40 halts its counting operation, and then counts down with the clock CK1 during a period of ramp bits in a trailing edge. The amplitude controller 40 is configured to provide its count value to the multiplier 50 as an amplitude data AM.

The multiplier 50 multiplies the data IQC read from the ROM 35 and the amplitude data AM in response to a clock CK2 of 3.84 MHz supplied from the S/R control circuit (not shown), to generate a transmission signal data IQT. The I/Q-discriminator 60 divides the transmission signal data IQT into transmission signal data IT of in-phase and transmission signal data QT of quadrature-phase in response to the clock CK1.

The transmission signal data IT and QT are transformed to radio signals and are transmitted via a transmission unit (not shown).

The operation will be described below.

In a mobile station, when a transmission timing for a specified time-slot occurs, the transmission-window signal TW is supplied from S/R control circuit to the timing generator 20, and then the transmission data TD is supplied to the differential encoder 10.

The differential encoder 10 generates some codes according to the π/4 shift QPSK orthogonal modulation system from the transmission data TD in synchronism with the transmission clock TC, which are output as signals IA and QA to the shift registers 31 and 32 respectively. The timing generator 20 generates a shift clock SC, a reset signal RS, and a count control signal based on the transmission-window signal TW.

The shift registers 31 and 32 converts the signals IA and QA into parallel data signals in synchronism with the shift clock SC, the parallel data signals being sent to the selector 33. The selector 33 selects an alternate one of the signals IB and QB in response to the clock CK1, the selected one being supplied as a signal IBQ to the ROM 35. On the other hand, the counter 34 generates a count value CN in response to the clock CK1 with the repetitive range of 0 to 9, the value CN being supplied to the ROM 35. In the ROM 35, the stored contents which are associated with an address specified by the signal IBQ and the count value CN are read sequentially as data IQC including the in-phase component and the quadrature-phase component.

The amplitude controller 40 generates a amplitude data AM based on the count control signal TM and the clock CK1, the amplitude data AM being supplied to the multiplier 50. The multiplier 50 multiplies the data IQC read from the ROM 35 and the amplitude data AM in response to the clock CK2, to generate transmission signal data IQT. The I/Q-discriminator 60 divides the transmission signal data IQT into the transmission signal data IT of in-phase and the transmission signal data QT of quadrature-phase in response to the clock CK1.

When the transmission of a specified time-slot is completed, a reset signal RS is output from the timing generator 20, and then the contents held by the shift registers 31 and 32 are cleared to prepare for the next transmission data.

However, a prior art modulation circuit raises the following problems.

When the transmission of the specified time-slot is completed, a reset signal RS is output from the timing generator 20, and then the contents held by the shift registers 31 and 32 are cleared. The timing for outputting the reset signal RS arises after the signals IA and QA held by the shift registers 31 and 32 during a constant period are completely read out. For example, that timing of the reset signal RS might arise just 16 clocks late from the completion of the transmission-window signal TW.

Therefore, in order to transmit data at a rate such as 64 kbps, if the amount of guard bits become small due to timing gaps for use of two successive time-slots, it is likely that the effective reset signal RS will not be output, then appropriate data transmission might not be performed.

OBJECTS AND SUMMARY OF THE INVENTION

In order to overcome above mentioned problem and others, the improved modulation circuit in TDMA communication in accordance with the present invention includes a first encoder and a second encoder for differentially encoding each transmission data in the odd-numbered and the even-numbered time-slot respectively, a first filter and a second filter for passing a narrow-banded portion of the signals differentially encoded by the first and second encoders, and a signal combiner for combining each of signals output from the first and second filters to generate a transmission signal.

The modulation circuit configured in accordance with the present invention provides following advantages.

The transmission data in odd-numbered time-slots is differentially encoded with the first encoder, then is transformed in a narrow-band using the first filter. The transmission data in even-numbered time-slots is differentially encoded with the second encoder, then is transformed in a narrow-band using the second filter. The narrow-banded signals from the first and second filters are combined with each other using the signal combiner to generate a transmission signal.

BRIEF EXPLANATION OF THE DRAWINGS

The above set forth and other features of the invention are made more apparent in the ensuring Detailed Description of the Invention when read in conjunction with the attached Drawing, wherein:

FIG. 4 is a block diagram of the modulation circuit in the second embodiment in accordance with the present invention.

DETAILED DESCRIPTION OF THE PREFERRED EMBODIMENT

Figure 1:
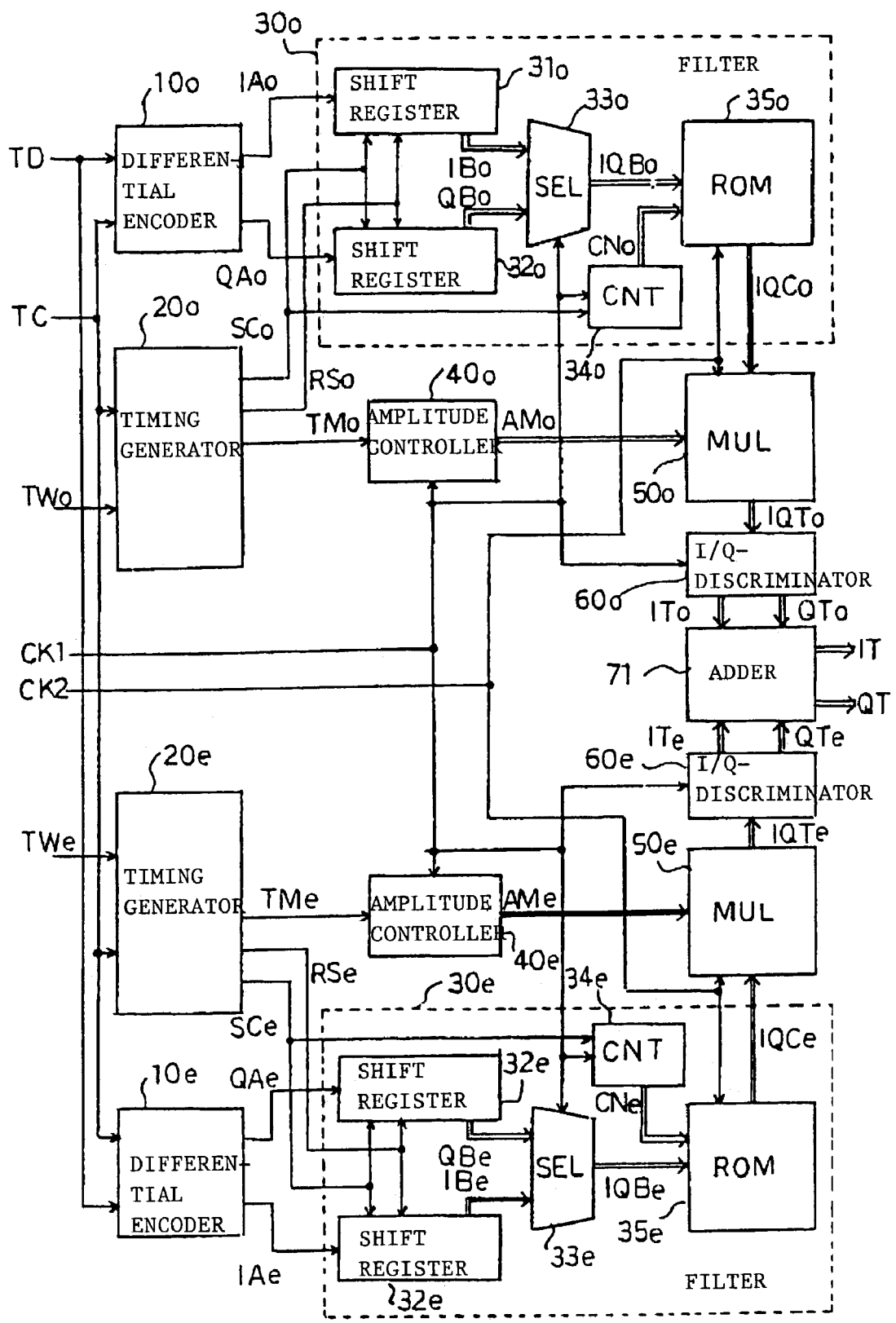
FIG. 1 is a block diagram of a modulation circuit in the first embodiment in accordance with the present invention.
Figure 2:
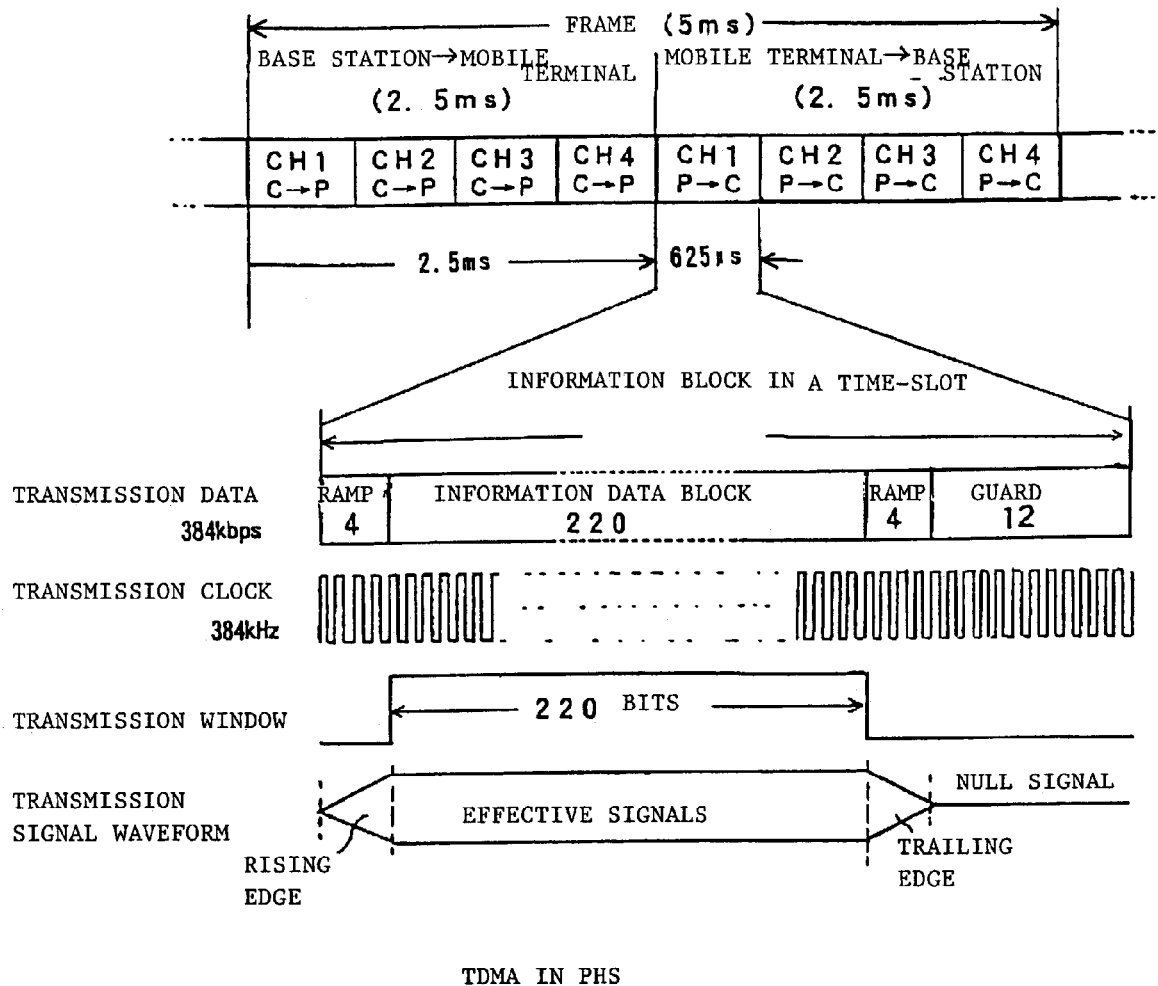
FIG. 2 is a schematic diagram explaining TDMA in PHS.
Figure 3:
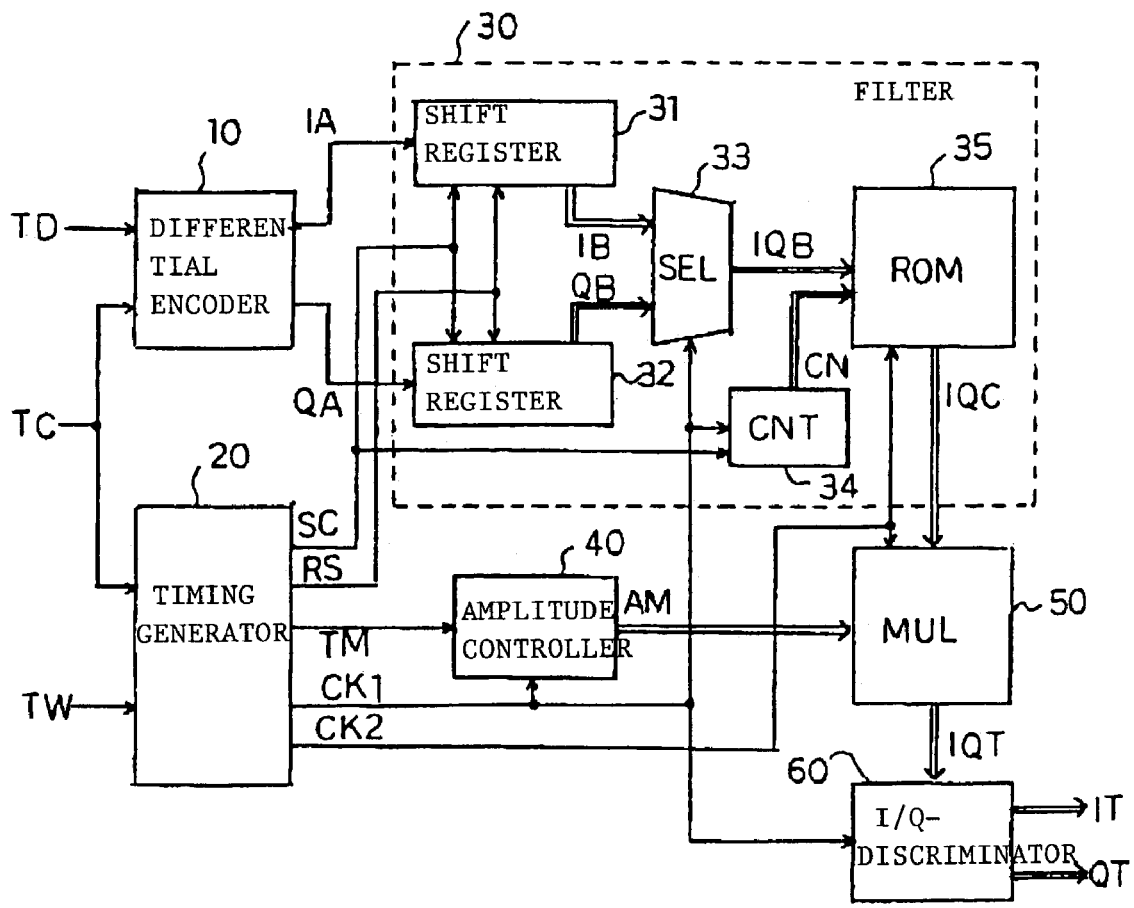
FIG. 3 is an exemplary block diagram illustrating a prior art modulation circuit.

The first embodiment of the present invention will be described. FIG. 1 shows the block diagram of a modulation circuit in accordance with the present invention. Common elements in FIG. 1 and FIG. 3 are indicated by the same numerical.

This modulation circuit includes dual modulation units, or one modulation unit (referred to as odd-dedicated unit) for processing data in odd-numbered time-slots (i.e., CH1 and CH3), and another modulation unit (referred to as even-dedicated unit) for processing data in even-numbered time-slots (i.e., CH2 and CH4). Both of the odd-dedicated modulation unit and the even-dedicated modulation unit are configured in the same manner. For easy understanding, the same elements in the odd-dedicated unit and the even-dedicated unit can be distinguished by two different suffixes, i.e., "o" for the odd-dedicated unit's elements and "e" for the even-dedicated unit's elements.

The odd-dedicated modulation unit includes a differential encoder 10*o* provided with a transmission data TD and a transmission clock TC from a S/R control circuit (not shown), a timing generator 20*o* provided with a transmission clock TC and a transmission-window signal TWo, and a filter 30*o*.

The differential encoder 10*o* generates a signal IAo of the in-phase components and a signal QAo of the quadrature-phase components in the π/4 shift QPSK orthogonal modulation system, from burst-formed transmission data TD of 384 Kbps provided in synchronism with a transmission clock TCe of 384 KHz. The signals IAo and QAo are supplied to the filter 30*o*. The timing generator 20*o* generates various timing signals required for the respective parts in the odd-dedicated unit modulation circuit, based on the transmission clock TC and the transmission-window signal TWo corresponding to the transmission data TD of 220 bits.

The filter 30*o* transforms the signals IAo and QAo to signals in a narrow-band using a Nyquist Filter, and is comprised of shift registers 31*o* and 32*o*, a selector 33*o*, a counter 34*o*, and a ROM 35*o*.

The shift registers 31*o* and 32*o* shift the signals IAo and QAo supplied from the differential encoder 10*o* in accordance with the shift clock SCo of 192 KHz supplied from the timing generator 20o, and hold the shifted signals and then output them as signals IBo and QBo in a parallel form. The shift registers 31o and 32o are also configured to be cleared in its contents in response to a reset signal RSo supplied from the timing generator 20o. The output ports of the shift registers 31o and 32o are coupled with the input ports of the selector 33o.

The selector 33o selects an alternate one of the signals IBo and QBo to output it as a signal IQBo, in response to a clock CK1o supplied from the S/R control circuit (not shown). The frequency of the clock CK1o is 1.92 MHz, its value is 10 times as long as the shift clock SCo. The counter 34o counts the clock CK1o repetitively from 0 to 9 in increments of 1. Its count value CNo is provided as an address signal for reading the ROM 35o, together with signal IQBo output from the selector 33o. Also, the counter 34o is configured to be reset at a rising edge of the shift clock SC supplied from the timing generator 20.

The ROM 35o stores data of narrow-banded signal waveforms of the in-phase component and the quadrature-phase component in the π/4 shift QPSK orthogonal modulation signals. The values of the waveform data are sampled from signals IBo and QBo at the frequency being 10 times as long as modulation rate (192 K symbol/s). Specifying an address of the ROM 35o with the signal IQBo and the count value CNo, the ROM 35o is configured to enable the value in its memory area to be read as data IQCo.

Furthermore, this odd-dedicated unit modulation unit includes an amplitude controller 40o, a multiplier 50o, and an I/Q-discriminator 60o.

The amplitude controller 40o is comprised of an up-down counter to generate amplitude data AMo for controlling the amplitude of transmission signals, based on the count control signal TMo and the clock CK1o supplied from the timing generator 20o. The amplitude controller 40o is reset when null transmission occurs and when guard bits appear in a transmission time-slot, and then counts up by the clock CK1o during the period of ramp bits in a rising edge. During the transmission of transmission data, the amplitude controller 40o halts the counting operation, and count down by the clock CK1o during ramp bits in a trailing edge. The count value of the amplitude controller 40o is supplied to the multiplier 50o as amplitude data AMo.

The multiplier 50o multiplies the data IQCo read from the ROM 35o and the amplitude data AMo to generate transmission signal data IQTo in response to the clock CK2o of 3.84 MHz supplied from S/R control circuit (not shown). The I/Q-discriminator 60o divides transmission signal data IQTo into transmission signal data ITo of in-phase and transmission signal data QTo of quadrature-phase in response to the clock CK1o, and then outputs them.

Likewise, the even-dedicated modulation unit includes a differential encoder 10e provided with transmission data TD and a transmission clock TC from the S/R control circuit (not shown), a timing generator 20e provided with the transmission clock TC and a transmission-window signal TW, a filter 30e, an amplitude controller 40e, a multiplier 50e, and an I/Q-discriminator 60e. The even-dedicated modulation unit is also configured to output transmission signal data ITe of in-phase and transmission signal data QTe of quadrature-phase from the I/Q-discriminator 60e.

Furthermore, this modulation circuit includes an adder 71. The adder 71 performs a logical OR operation to the transmission signal data ITo and ITe, and then outputs the transmission signal data IT, and also similarly performs a logical OR operation to the transmission signal data QTo and QTe and then outputs the transmission signal data QT. The transmission signal data IT and QT output from adder 71 are led to transmission unit (not shown), and are converted to radio signals to transmit.

The operation will be described below.

In a mobile station, when a transmission timing for an odd-numbered time-slot occurs, a transmission-window signal TWo is supplied from the S/R control unit to the timing generator 20o, simultaneously, the transmission data TD is supplied to the differential encoder 10o.

The differential encoder 10o generates some codes according to the π/4 shift QPSK orthogonal modulation system from the transmission data TD in synchronism with the transmission clock TC, which are output as signals IAo and QAo to the shift register 31o and 32o of the filter 30o. Meantime, the timing generator 20o generates a shift clock SCo, a reset signal RSo, and a count control signal TMo based on the transmission-window signal TWo.

The filter 30o sequentially sends the signals IAo and QAo to the respective shift registers 31o and 32o in synchronism with the shift clock SCo, and then converts the signals IAo and Qao into data signals in a parallel form, the converted data signals being sent as signals IBo and QBo to the selector 33o. The selector 33o selects an alternate one of the signals IBo and QBo and then outputs it as signal IQBo in response to the clock CK1o.

The counter 34o counts a count value CNo repetitively from 0 to 9 in increments of 1 in response to the clock CK1o. The signal IBQo and the count value CNo are supplied to the ROM 350 as an address signal. Thereby, the data IQCo is read sequentially from the ROM 35o.

The amplitude controller 40o generates amplitude data AMo and then supplies it to the multiplier 50o based on the count control signal TMo and the clock CK1o. The multiplier 50o multiplies the data IQCo read from the ROM 35o and the amplitude data AMo to generate the transmission signal data IQTo in accordance with clock CK2o. The I/Q-discriminator 60o divides the transmission signal data IQTo into in-phase and quadrature-phase transmission signal data ITo and QTo in response to the clock CK1o.

The adder 71 performs an add operation for the data output from the I/Q-discriminator 60o and the data output from the I/Q-discriminator 60e. Wherein, since there is no output data for odd-numbered time-slots from the I/Q-discriminator 60e, the transmission signal data ITo and QTo are output as transmission signal data IT and QT from the I/Q-discriminator 60o without any operations.

When the transmission of the odd-numbered time-slot is completed, a reset signal RSo is output from the timing generator 20o, and then the contents held by the shift registers 31o and 32o are cleared to prepare for the next odd-numbered time-slot.

Next, at a transmission timing for an even-numbered time-slot, a transmission-window signal TWe is supplied to the timing generator 20e from the S/R control unit, simultaneously, the transmission data TD is supplied to the differential encoder 10e.

A procedure similar to the odd-dedicated unit proceed in the even-dedicated unit, the transmission signal data ITe and QTe from the I/Q-discriminator 60e are output as transmission signal data IT and QT via the adder 71 without any operations.

When the transmission of the even-numbered time-slot is completed, a reset signal RSe is output from the timing generator 20e, thereby the contents held by the shift registers 31e and 32e are cleared to prepare for the next even-numbered time-slot.

Accordingly, the modulation circuit in the first embodiment is comprised of an odd-dedicated unit for processing the odd-numbered time-slots and an even-dedicated unit for processing even-numbered time-slots. Thus, if the amount of guard bits decrease, the process for adjacent time-slots can be performed surely. This feature provides one advantage.

The second embodiment of the present invention will be described here. FIG. 4 shows the block diagram of a modulation circuit in the particular embodiment. Common elements in FIG. 1 and FIG. 4 are indicated by the same numerical.

This modulation circuit includes a selective signal generator 72 and a selective unit 73 instead of the adder 71 in the modulation circuit of FIG. 1.

The selective signal generator 72 generates a selective signal SL for selecting one of the odd-dedicated unit modulation unit and the even-dedicated unit modulation unit based on the transmission-window signals TWo and TWe supplied from the R/S control unit (not shown). Also, the selective unit 73 selects a signal from either the I/Q-discriminator 60o or the I/Q-discriminator 60e in accordance with the selective signal SL, the selected signals being output as transmission signal data IT and QT. The other configurations are same as one shown in FIG. 1.

The operation of the modulation circuit is basically the same as the one in FIG. 1 excluding the difference that the resultant transmission signal data IT and QT are output from the adder 71 or from the selective unit 73 on its selections.

Accordingly, the modulation circuit in the second embodiment is comprised of an odd-dedicated unit for processing the odd-numbered time-slots and an even-dedicated unit for processing even-numbered time-slots. Thus, the particular modulation circuit provides same advantages as one in the first embodiment.

Figure 5:
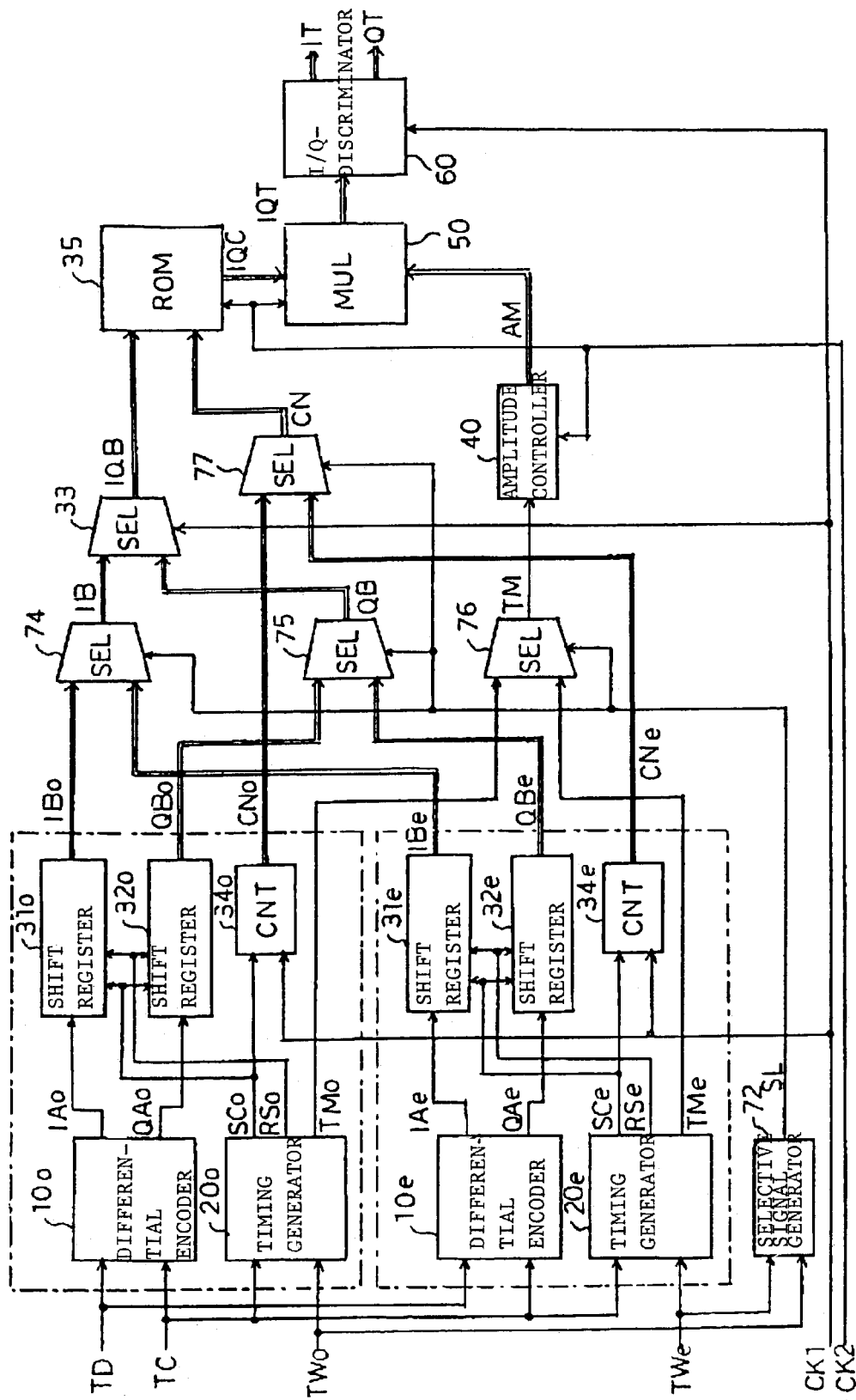
FIG. 5 is a block diagram of the modulation circuit in the third embodiment in accordance with the present invention.

The third embodiment of the present invention will be described here. FIG. 5 shows the block diagram of a modulation circuit in the particular embodiment. Common elements in FIG. 1 and FIG. 5 are indicated by the same numerical.

This modulation circuit uses the ROMs 35o and 35e in a sharing manner, and the ROMs 35o and 35e which are not used simultaneously by both of the odd-numbered time-slot and the even-numbered time-slots in the modulation circuit of FIG. 1. Thereby, the modulation circuit minimizes the increase of its dimensions.

This modulation circuit includes a differential encoder 10o, a timing generator 20o, shift registers 31o and 32o, and a counter 34o, each of which are associated with odd-numbered time-slots, and also includes a differential encoder 10e, a timing generator 20e, a shift registers 31e and 32e, and a counter 34e, each of which are associated with even-numbered time-slots.

Signals IBo and IBe are output from the shift registers 31o and 31e respectively, and are supplied to selector 74, while signals QBo and QBe are output from the shift registers 32o and 32e respectively, and are supplied to the selector 75. Also, a count control signal TMo generated with the timing generator 20o, and a count control signal TMe generated with the timing generator 20e are both supplied to the selector 76. Count values CNo and CNe from the counters 34o and 34e are supplied to the selector 77. The output ports of the selector 76 are coupled with the amplitude controller 40. The Selector 74-77 are configured to be switched in accordance with a selective signal SL generated with the selective signal generator 72 based on the transmission-window signals TWo and TWe.

The output ports of the selector 74 and 75 are coupled with the input ports of the selector 33. The control ports of the selector 33 are provided with the clock CK1, thereby an alternate one of the signals IB and QB supplied from the selector 74 and 75 is selected and output as signal IQB. The signal IQB is provided as an address signal for reading the ROM 35 together with the count value CN supplied from the selector 77.

The data IQC read from the ROM 35 and the amplitude data AM output from the amplitude controller 40 are supplied to the multiplier 50. The multiplier 50 multiplies the data IQC and the amplitude data AM in response to the clock CK2 to generate transmission signal data IQT. The output ports of the multiplier 50 are coupled with the I/Q-discriminator 60. The multiplier 50 divides the transmission signal data IQT into transmission signal data IT of in-phase and transmission signal data QT of quadrature-phase in response to the clock CK1.

The transmission signal data IT and QT are provided to a transmission unit (not shown), and then are converted to radio signals to transmit.

The operation will be described below.

When a transmission timing for an odd-numbered time-slot occurs, a transmission-window signal TWo is supplied to the timing generator 20o from the R/S control unit, while a transmission data TD is supplied to the differential encoder 10o.

The differential encoder 10o generates signals IAo and QAo from the transmission data TD in synchronism with the transmission clock TC, to supply them to the shift registers 31o and 32o. The timing generator 20o generates a shift clock SCo, a reset signal RSo, and a count control signal TMo based on the transmission clock TC and the transmission-window signal TWo.

The shift registers 31o and 32o covert the respective signals IAo and QAo to signal data in a parallel form in synchronism with the shift clock SCo, the converted signal data being sent as signals IBo and QBo to the selector 74 and 75 respectively. The selector 74 and 75 selects one of the signals IBo and QBo sent from the shift registers 31o and 32o respectively in accordance with a selective signal SL supplied from the selective signal generator 72, the selected one being supplied to the selector 33. The selector 33 selects an alternate one of the signals IB and QB in response to the clock CK1, the selected one being output out as a signal IQB.

In the counter 34o, the count value CNo is reset by the shift clock SCo, and then is counted repetitively from 0 to 9 in increments of 1 in response to the clock CK1, and is supplied to the selector 77. The selector 77 selects the count value CNo upon the selective signal SL and outputs it as count value CN. The signal IQB and the count value CN and outputs as an address signal for reading the ROM 35 from which the data IQC including the in-phase component and the quadrature-phase component is read sequentially.

The selector 76 generates a count control signal TMo from the timing generator 20o and sends it to the amplitude controller 40o from which the amplitude data AM is supplied to the multiplier 50.

The multiplier 50 multiplies the data IQC read from the ROM 35 and the amplitude data AM in response to the clock CK2 to generate transmission signal data IQT. The I/Q-discriminator 60 divides the transmission signal data IQT into transmission signal data IT and QT in response to the clock CK1.

When the transmission of the odd-numbered time-slot is completed, a reset signal RSo is output from the timing generator 20o, and the contents held by the shift registers 31o and 32o are cleared to prepare for the next transmission data of an odd-numbered time-slot.

When the transmission timing of an even-numbered time-slot occurs, a shift clock SCe and a count control signal TMe are output from the timing generator 20e based on the transmission-window signal TWe. Thereby, signals IAe and QAe generated from the differential encoder 10e are converted into signal data in a parallel form by the shift registers 31e and 32e, and are output as signals IBe and QBe. One of the signals IBe and QBe is selected with the selector 74 and 75, and is supplied to the selector 33. Also in the selector 76, the count control signal TMe is selected and supplied to the amplitude controller 40. The succeeding operations are likewise with the case of odd-numbered time-slots.

When the transmission of the even-numbered time-slot is completed, a reset signal RSe is output from the timing generator 20e, and the contents held by the shift registers 31e and 32e are cleared to prepare for the next transmission data of an even-numbered time-slot.

Accordingly, in the modulation circuit of the third embodiment, some elements which tend to operate competitively in both use of odd-numbered time-slots and even-numbered time-slots are configured in dual units having same functions, while other elements which do not so are shared in use. The former elements are the differential encoder 10, the timing generator 20, the shift registers 31 and 32, and the counter 34. The latter elements are the selector 33, the ROM 35, the amplitude controller 40, the multiplier 50, and the I/Q-discriminator 60.

Accordingly, the modulation circuit as shown and described above in accordance with the present invention includes dual encoder units and dual filter units for processing each transmission data of odd-numbered and even-numbered time-slots. Thereby, the appropriate data transmission can be achieved in spite of the decrease of guard bits between a couple of time-slots.

The practices according to the present invention are not limited to the particular embodiments described herein, the various alternations and variations can be made by those skilled in the art without departing from the scope and spirit of the present invention.

As exemplary illustrations, the modulation circuit in PHS was described. However, the present invention can be applied to any modulation circuits in wire-less TDMA as well as in wired TDMA. Further, the filter as shown in FIG. 1 will not be limited to Nyquest Filter, it may be other types.

What is claimed is:

1. A modulation circuit for time division multiple access comprising:
   a first encoder and a second encoder for differentially encoding transmission data signals in odd-numbered and even-numbered time-slots respectively;
   a first filter and a second filter for generating narrow-banded signals in accordance with at least one shift clock signal and at least one reset signal on the basis of the signals differentially encoded by said first and second encoders;
   a signal combiner for combining signals output from said first and second filters to generate transmission signals; and
   at least one timing generator for generating said at least one shift clock signal in accordance with at least one transmission-window signal giving timing of transmission data in odd-numbered and even-numbered time-slots, and for generating said at least one reset signal at an end of the each transmission data,
   wherein each of said first filter and said second filter comprises:
      a shift register for transforming said signal differentially encoded by applying a synchronized shift operation with said at least one shift clock signal for said signal differentially encoded into a parallel-formed signal, said register being configured to be cleared in its content in response to said at least one reset signal; and
      a ROM for storing data of narrow-banded signal waveforms corresponding to said signal differentially encoded in its memory areas, and reading data of the narrow-banded signal waveforms in a memory area specified by said parallel-formed signal from said shift register as an address signal.

2. The modulation circuit as in claim 1, wherein said signal combiner performs a logical OR operation for the signals output from said first and second filters to generate said transmission signals.

3. The modulation circuit as in claim 1, wherein said signal combiner switches either the signal output from said first filter or the signal from said second filter alternately in accordance with said odd-numbered time-slot or said even-numbered time-slot, to generate said transmission signals.

4. A modulation method for time division multiple access comprising:
   differentially encoding transmission data in odd-numbered and even-numbered time-slots respectively in a first encoder and a second encoder;
   transforming the signals which are differentially encoded by said first and second encoders in first and second shift registers, to parallel-formed signals by applying a shift operation for the signals which are differentially encoder;
   selecting a corresponding one of said parallel signal data in accordance with said odd-numbered time-slot or even-numbered time-slot;
   resetting a corresponding one of said first and second shift registers by clearing its content in response to a reset signal which is generated at an end of the each transmission data;
   reading each data of narrow-banded signal waveforms from a first ROM and a second ROM using said parallel-formed signal as address signals, said ROMs storing data of the narrow-banded signal waveforms corresponding to each of said signals differentially encoded; and
   combining signals read from said first and second ROMs to generate transmission signals.

* * * * *